United States Patent [19]
Groh et al.

[11] Patent Number: 4,500,488
[45] Date of Patent: Feb. 19, 1985

[54] ENCAPSULATED FUEL UNIT AND METHOD OF FORMING SAME

[75] Inventors: Edward F. Groh, Naperville, Ill.; Dale A. Cassidy, Valparaiso, Ind.; Edward F. Lewandowski, Westmont, Ill.

[73] Assignee: The United States of America as represented by the United States Department of Energy, Washington, D.C.

[21] Appl. No.: 415,117

[22] Filed: Sep. 7, 1982

[51] Int. Cl.³ .............................................. G21C 3/04
[52] U.S. Cl. .................................... 376/409; 376/432; 376/451; 376/456; 376/903; 29/400 N
[58] Field of Search ............... 376/432, 903, 451, 456, 376/457, 426, 901, 903, 409; 29/400 N, 723; 228/182, 186

[56] References Cited

U.S. PATENT DOCUMENTS

| | | | |
|---|---|---|---|
| 2,757,444 | 8/1956 | Chace | 228/186 X |
| 2,915,815 | 12/1959 | Bean et al. | 376/451 X |
| 2,920,025 | 1/1960 | Anderson | 376/903 X |
| 2,991,601 | 7/1961 | Glatter et al. | 376/451 X |
| 3,091,581 | 5/1963 | Barr et al. | 376/901 X |
| 3,141,227 | 7/1964 | Klepfer et al. | 228/182 X |
| 3,156,976 | 11/1964 | Whiting | 228/182 X |
| 3,297,543 | 1/1967 | Jessen et al. | 376/432 X |
| 3,324,540 | 6/1967 | Lotts et al. | 376/451 X |
| 3,699,638 | 10/1972 | Van Dievoet | 29/400 N X |
| 3,902,038 | 8/1975 | Heichel | 219/61 X |
| 4,059,439 | 11/1977 | McCuaig | 376/901 X |

OTHER PUBLICATIONS

"Zero Power Plutonium Reactor", Aug. 1978.

*Primary Examiner*—Richard E. Schafer
*Assistant Examiner*—Daniel Wasil
*Attorney, Agent, or Firm*—Charles F. Lind; Hugh W. Glenn

[57] ABSTRACT

This invention teaches an encapsulated fuel unit for a nuclear reactor, such as for an enriched uranium fuel plate of thin cross section of the order of 1/64 or ⅛ of an inch and otherwise of rectangular shape 1-2 inches wide and 2-4 inches long. The case is formed from (a) two similar channel-shaped half sections extended lengthwise of the elongated plate and having side edges butted and welded together to define an open ended tube-like structure and from (b) porous end caps welded across the open ends of the tube-like structure. The half sections are preferably of stainless steel between 0.002 and 0.01 of an inch thick, and are beam welded together over and within machined and hardened tool steel chill blocks. The porous end caps preferably are of T-316-L stainless steel having pores of approximately 3-10 microns size.

8 Claims, 6 Drawing Figures

ENCAPSULATED FUEL UNIT AND METHOD OF FORMING SAME

CONTRACTUAL ORIGIN OF THE INVENTION

The U.S. Government has rights in this invention pursuant to Contract No. W-31-109-ENG-38 between the U.S. Department of Energy and the University of Chicago representing Argonne National Laboratory.

BACKGROUND OF THE INVENTION

Uranium of different isotopic ratios has long been used in research throughout the world to support the nuclear reactor development program. The uranium may be natural, containing the normal ratio of $^{235}U$ and $^{238}U$; enriched, where the $^{235}U$ content has been raised; or depleted, where the $^{235}U$ content has been reduced. In any case, bare uranium as a solid metal will oxidize when exposed to air. The rate of oxidation depends on several factors, including the degree of humidity in the atmosphere; and the oxide builds up on the surface of the parent metal and is radioactive. The oxide is easily brushed or scraped off the parent metal, so much so that anything coming in contact with the uranium becomes contaminated. This then requires an expensive decontamination process.

Finding a suitable protective coating has been a serious and ongoing problem. Many research programs limit the extraneous material that can be introduced into the reactor with the uranium. Hydrogeneous materials are particularly undesirable due to their strong interaction with the neutron flux in the reactor. This precludes the use of most plastics as a coating. Some nonhydrogeneous coatings are available, notably some of the chloro-, fluoro-, bromoethylene polymers. However, this type of coating has a limited useful life (two years or so) whereupon the uranium must be cleaned and recoated. Use and handling can also shorten this life and risk contamination of the area.

Often, the uranium fuel is only between 1/64" and ⅛" thick, and otherwise is shaped as rectangular plates from between 1" and 2" wide and 2" and 4" long. Attempts to encapsulate or clad the uranium plate(s) with stainless steel have not been totally successful either, because even when such encapsulating or cladding structures are formed of thin 15-20 mil (0.015-0.020") sheets, they generally introduce excessive extraneous material to adversely affect the sensitivity of the research. Moreover, manufacture of such structures with the narrow thickness-to-width ratios and with thin sheets of stainless steel has been difficult and unreliable, due to thermal warpage and dimensional instability.

The problem of uranium contamination is even more burdensome in tests involving both uranium and plutonium. Plutonium is almost always cladded or enclosed in a sealed container. Both uranium and plutonium are radioactive, releasing alpha radiation; however, plutonium is also biologically toxic. Thus, preliminary radiation tests are made to detect "leakers" (where the cladding or enclosing container of the plutonium is imperfect), but such tests cannot distinguish between a plutonium container having exterior contamination induced by rubbing against an oxidized uranium fuel plate and a "leaker" container. It then becomes necessary to double check the suspect plutonium container with more costly and sophisticated tests, and it yet further necessitates the decontamination of the container.

SUMMARY OF THE INVENTION

This invention relates to an improved stainless steel structure for holding uranium fuel formed as plates as small as 1/64" thick, to an improved method of forming such a structure, and to the combination of the structure having fuel plate(s) encapsulated therein.

This encapsulated unit is formed initially as a tube-like housing of very thin (5 mils–0.005") stainless steel sheet material, having an open/through dimension only slightly larger than the uranium fuel plate(s) that will fit inside the housing. End caps are designed to be welded to the housing to close the open ends thereof; one end cap being welded in place after the fuel plate(s) have been loaded into the housing so as to physically confine the fuel plate(s) therein. The end caps are preferably formed of a slightly porous metal having micron size pores, allowing the confined uranium to breath slightly while yet precluding the release of contaminating oxide from the uranium.

The technique for fabricating the encapsulating structures involves beam welding two C-shaped channels together along opposite side seams where the channel legs butt against one another. For uniform fixturing of the channels and for proper heat distribution during welding, interior and exterior chill blocks of ground and hardened tool steel are used to sandwich and hold the channels therebetween.

The interior chill block is composed of two wedges (1) that fit exactly thicknesswise between the two channel pieces when the ends of the channel legs just butt together, and (2) that can be expanded widthwise to snug up flush against the insides of the channel legs before welding and contracted widthwise to be easily removed from the tube-like housing after welding. A positioning pin is used to lock the widthwise expanded wedges quickly and accurately and with little operator effort. The channel pieces must butt exactly along the opposite side legs or they cannot be welded together.

The electron beam weld is actually made in an evacuated chamber or in an inert atmosphere. The parameters such as the feed speed along the seam, beam power, beam focusing, etc., are initially set by trial and error but thereafter are regulated automatically. As practiced now, several complete sets of interior and exterior chill blocks are fixtured as a stack on a table in the welder and the table is automatically moved and indexed to make the seam welds successively on one side only of each tube-like housing. Thereafter, the chill blocks are flipped over as a stack and refixtured, etc., to make seam welds on the opposite side of the housing.

DETAILED DESCRIPTION OF THE SUBJECT INVENTION

Figure 1:
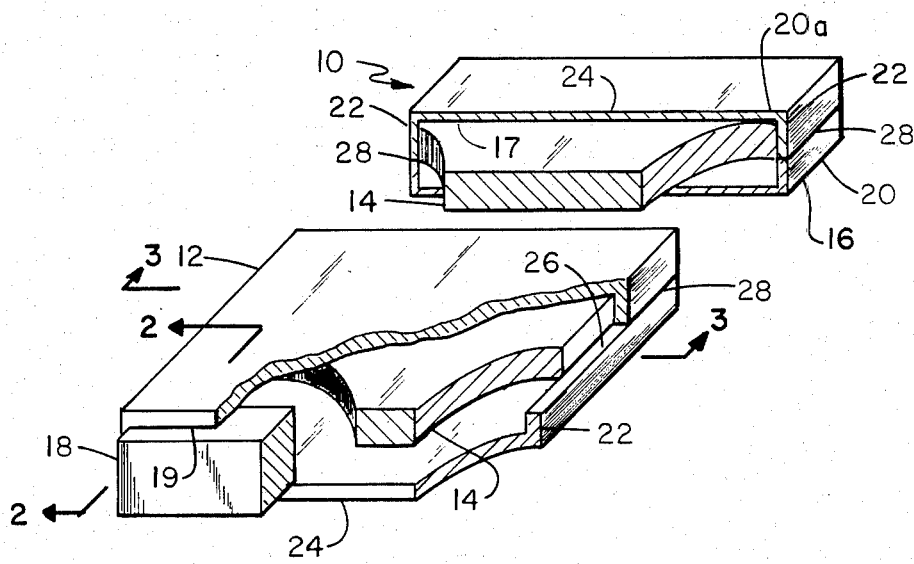
FIG. 1 is a perspective view of the improved encapsulated fuel unit, partly broken away and in section for clarifying the inventive concept.
Figure 2:
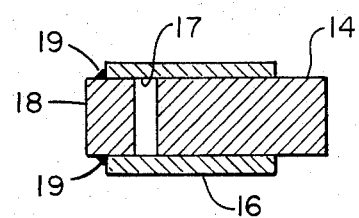
FIG. 2 is a sectional view as seen from line 2—2 in FIG. 1.
Figure 3:
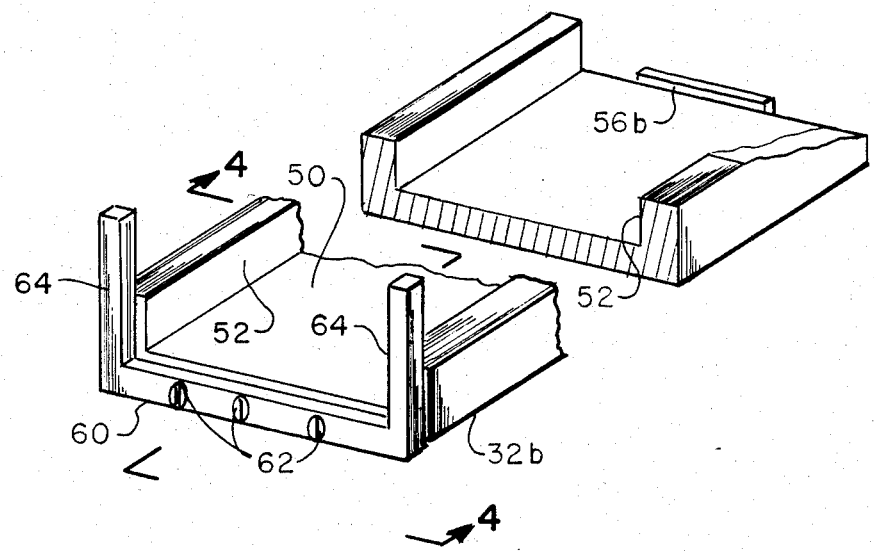
FIG. 3 is a perspective view of one exterior chill block used to form the encapsulated fuel unit of FIGS. 1 and 2.
Figure 4:
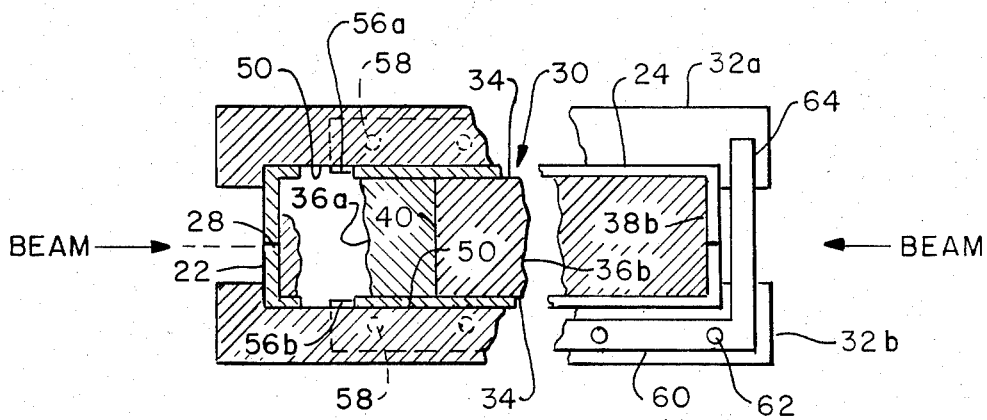
FIG. 4 is a sectional view as seen generally from line 4—4 in FIG. 3, except showing the fuel unit during the fabrication thereof, wherein certain housing components are in a welding fixture having interior and exterior chill blocks and showing schematically also the accessibility of a beam welder to the exposed butted edges of the housing components for welding thereof.
Figure 5:
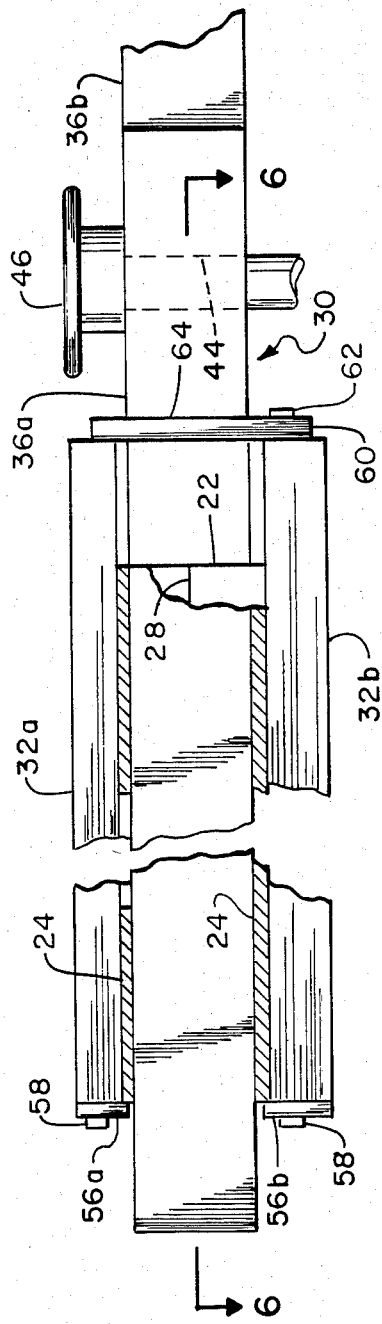
FIG. 5 is a side elevational view of the welding fixture illustrated in FIG. 4.
Figure 6:
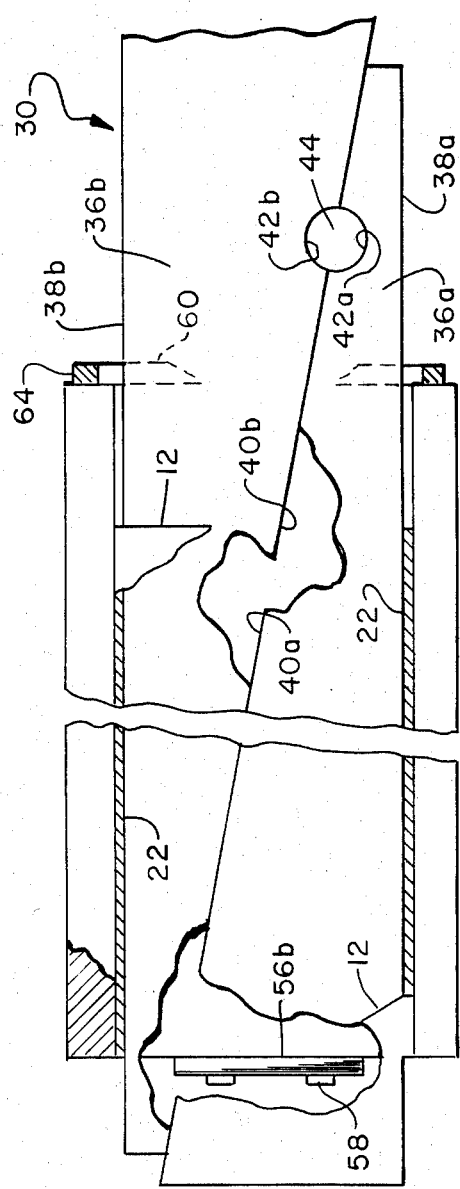
FIG. 6 is a top plan view as seen generally from line 6—6 in FIG. 5 illustrating the internal chill block wedges and the arrangement for locking same at the proper adjusted size.

An encapsulated fuel unit 10 is illustrated in FIG. 1 and includes an exterior case or housing 12 and in interior fuel piece 14 contained within the housing. The fuel piece 14 can typically have a very thin cross section, perhaps between 1/64 and ⅛ inch thick, and otherwise can be sized as a rectangular block 1 or 2 inches wide by 2, 3 or perhaps 4 inches long. The housing 12 is formed as a generally elongated tube-like body or structure 16 having an interior through-opening 17 that is only slightly larger (perhaps with only 0.001–0.01 inch clearance on each face) than the fuel piece 14, so that the housing itself is perhaps between 1/16 and 3/16 of an inch thick. The housing 12 would typically be made perhaps 4, 6 or 8 inches long so that one or several fuel piece(s) 14 can be put end-to-end into a single housing. An end cap 18 is welded across each open end of the tube-like structure 16, at least one of the end caps being welded after the fuel piece(s) have been loaded inside the structure, thereby virtually confining the fuel piece(s) 14 therein and defining the encapsulated fuel unit 10.

While the encapsulated fuel unit could have general utility with any nuclear fuel, it has particular utility for the storage of uranium enriched to varying levels, perhaps with $^{235}U$ being as high as 90–95%. In this regard, such fuel is commonly used in test reactors where specific quantities and combinations of uranium, plutonium and other fuels are disposed at varying placements within a reactor core. The fuels thus have to be stored in relatively small quantities to allow for fine-tuning of such placement and the needed versatility for the tests.

Of utmost importance to the subject invention is the fact that the end caps 18 are formed of a material having micron size pores which allows the confined fuel piece(s) 14 to breath in the encapsulated fuel unit 10. This extends the shelf life of the fuel unit 10 without dangerous chemical change as might take place with a voiding of oxygen, avoids pressure build-up due to the release of fission gases, and further precludes release or escape of uranium or oxide exteriorly of the unit for contaminating adjacent structures. One material successfully used for the end caps 18 is the porous T-316-L stainless steel sold by Pall Trinity of Villa Park, Ill. This material has pores of the order of 5 microns in size, although pore sizes in the range between 2 and 10 microns would appear suitable also. End caps 1/16 of an inch thick have allowed sufficient breathing of the confined uranium fuel piece(s) without adjacent contamination. Each end cap 18 is sized slightly smaller than the opening 17 of the tube-like structure 16 to allow penetration thereinto, and the exposed end cap is then preferably welded with an annular filet type weld 19.

The tube-like structure 16 is illustrated as being formed from two C-shaped channels 20. Each channel 20 is formed from very thin flat sheet stock, such as stainless steel between 0.002 and 0.01 of an inch (although 0.005 of an inch thick sheet stock might be preferred). The sheet stock is first sheared to the proper length and width and then small side legs 22 are press broke 90° from intermediate wall 24 to define the channel shape. Each leg 22 is only slightly longer than half the thickness of the fuel plate(s) 14 to be supported within the housing allowing for the slight clearance between the fuel plate and housing. The free ends 26 of corresponding pairs of channel legs 22 meet or butt precisely along the entire length of the channels so that welds 28 can be made along these seam to secure the channels 20 together as the tube-like structure 16.

The technique to be disclosed now has proven to be most successful in welding these thin stainless steel channels to define the tube-like structure, even though the structure has a low thickness to width ratio (1/16 to 2 inches for example) and a low thickness to length ratio (1/16 to 6 inches for example). In this regard, the welds between the two channels 20 are made by a beam welder (such as manufactured by Hamilton Standard of Windsor Lock Company, Conn., a division of United Aircraft) in a protected atmosphere, either a vacuum or an inert gas, where a high energy beam directed towards the butted edges to be joined together directly fuses the channels themselves together.

In using a beam welder (not shown), chill blocks are used to fixture the channels 20 and to dissipate excess heat away from the channel portions adjacent the welds. To form the tube-like housing structure 16, an expandable interior chill block 30 is used which can be snugged flush against the inside of the channel legs 22 before welding and can then be collapsed to allow endward removal from the structure after the welds have been made; and separate exterior chill blocks 32a and 32b sandwich the channels 20 against the interior chill block while the welds are being made.

The interior chill block 30 is made the precise thickness across the opposite parallel faces 34 so that the intermediate channel walls 24 lie flush against the chill block while correspondingly the free ends of the channel legs 22 just butt one another. The interior chill block 30 is actually formed of two wedges 36a and 36b having parallel outer face 38a and 38b and angled faces 40a and 40b that slide on one another. Thus, by axially shifting the wedges 36a and 36b along the angled faces 40, the width across the outer faces 38a and 38b of the interior chill block 30 is adjusted. Two half-holes 42a and 42b are formed in the angled faces 40a and 40b of the wedges 36a and 36b, respectively, and become aligned to form a full circular opening 44 when the block wedges are shifted to the expanded position thereof where the outer faces 38 are precisely snugged against the inside faces of the channel legs 22; and positioning pin means 46 is used, to be inserted in the opening 44, so as to lock the wedges in this expanded position. With this keying arrangement, it is relatively easy to repeatedly expand the interior chill block wedges 36a and 36b for fixturing different pairs of channels 20 while maintaining the same critical dimensions.

The collapsible interior chill block 30 is needed since the welding process shrinks the channels 20 slightly over the interior chill block, and a noncollapsible interior chill block would be quite difficult to remove without exerting large separating forces that might disrupt the tolerances of the finished tube-like structure 16. In a preferred embodiment, the interior chill block wedges 36a and 36b are manually brought into or removed from operative relative assembly from opposite ends of the channels 20 or finished tube-like structure 16.

Each exterior chill block 32a and 32b similarly has a flat intermediate face 50 that butts flush against the intermediate wall 24 of the channel 20, and side shoulders 52 that engage and locate the corners of the channels at the channel legs 22. End stops 56a and 56b are secured by bolts 58 to corresponding ends of the exterior chill blocks 32, each stop projecting away from the intermediate face 50 a distance just less than the thickness of the channel 20 (0.004 of an inch projection versus 0.005 of an inch thick channel, for example). Thus the channel can be slid along and within the exterior chill block until it butts against the stop, whereby each channel is properly positioned then relative to its exterior chill block. The exterior chill blocks 32a and 32b are located relative to one another by means of a U-shaped stop 60 secured by bolts 62 to the opposite end of chill blocks 32b where the end legs 64 of the stop 60 span across and butt the corresponding end of the other chill block 32a. Thus, it is easy to repeatedly and accurately locate the interior and exterior chill blocks relative to one another and to the channels 20 on different sets of channels.

A preferred arrangement provides that many pairs of exterior and interior chill blocks, each butted against and sandwiching its two channels that will be joined to form each tube-like housing, can be stacked back-to-back against one another and fixtured or clamped snuggly together. Thus, ten such paired chill block assemblies might be fixtured together on a table (not shown) in the beam welder so that the butted end edge seams to be welded are all exposed and parallel to one another. The table can then be moved automatically according to the indexing program of the welder, to cause each butted end edge on successive passes to be moved past the electron beam for welding each successive seam. Afterwards, the entire stack of chill block assemblies can be flipped over 180° to weld the opposite side seams.

The chill blocks associated with a conventional beam welder have typically been made of copper. However, copper chill blocks were found inadequate in fabricating this tube-like structure, with the thin gauge material and very high width and length to thickness ratios, as they did not retain accurate dimensions under the thermal fluctuations of the beam welder. This appeared to be particularly evident regarding the interior chill block wedges having the thin but relatively long and wide shapes. However, chill blocks formed of hardened and ground tool steel unexpectedly proved to be most adequate, allowing for very accurate initial fabrication and further providing exceptional dimensional stability and durability during repeated use. This is even so with respect to the separate interior chill block wedges, with the thin cross section extended over much greater width and length and further that must be handled extensively both before welding and after welding. Thus successive tube-like structures can be made according to the proposed technique with high accuracy and very low rejection rate.

The end cap weld 19 can be performed by a skilled aritsan in the open atmosphere using heliarc equipment. Again, exterior chill blocks (not shown) are used to fixture the tube-like housing 16 during this welding. Because this end cap weld 19 is confined to a relatively small axial direction and the weld is made relative to a substantially stocky or heavy (1/16 of an inch) end cap 18; thermal warpage is of only minor concern.

It can readily be appreciated that this tube-like structure 16 is most suited to enclose the very thin fuel piece(s) 14 for protecting them against breakage and the possibility of spreading radioactive contamination upon contacting adjacent structures. The porous end caps 18 allow some fuel breathing for extended shelf life, without the problems commonly experienced with oxygen voiding of the fuel pieces, and also allow the release of fission gases to minimize pressure build-ups of the encapsulated fuel unit.

While a particular embodiment of the present invention has been shown and described, it will be apparent to those skilled in the art that changes and modifications may be made therein without departing from the invention in its broader aspects. The aim of the appended claims, therefore, is to cover the invention in the spirit of the actual disclosure and all such changes and modifications thereof.

The embodiments of the invention in which an exclusive property or privilege is claimed are defined as follows:

1. An encapsulated nuclear fuel unit having very low thickness-to-width and thickness-to-length ratios, comprising a piece of nuclear fuel sized approximately between 1 and 2 inches in width, 1 and 4 inches in length, and only 1/64 and ⅛ of an inch in thickness; and a rigid housing virtually enclosing and encapsulating the fuel piece, said housing having an open-ended body section defining an interior opening just slightly larger than the cross section of the fuel piece thereby being operable to receive the fuel piece and being elongated lengthwise to extend beyond the fuel piece, the body section being formed as two C-shaped channel pieces each having an intermediate wall and two short legs angled substantially normal thereto and welded together along opposite butted edges extended along the narrow sides of the body section and being of an impervious material between 0.002 and 0.01 of an inch thick, and said housing having rigid but porous end caps secured across and closing the open ends of the body section outwardly of the fuel piece.

2. An encapsulated nuclear fuel unit according to claim 1, wherein the porous material of the end cap has pores of approximately 3–10 microns size.

3. A method of encapsulating a nuclear fuel piece having a thickness of between 1/64 and ⅛ of an inch, a width between 1 and 2 inches and a length between 1 and 4 inches, comprising the steps of forming an open-ended housing by fixturing two C-shaped channel pieces, each of stainless steel of a thickness between 0.002 and 0.01 of an inch, snuggly over internal chill block means sized so that the free ends of the channel legs abut and welding the butted ends of the legs together, closing one of the open ends of the housing by welding a porous end plug thereto, loading the fuel piece into the other open end of the housing, and closing this other open end by welding a second porous end cap thereto thereby defining an encapsulated fuel unit of very low thickness-to-width and thickness-to-length ratios.

4. The method of encapsulating a nuclear fuel piece according to claim 3, further including the step of welding the channel pieces together with an electron beam in a sealed chamber having an inert gas atmosphere or a high vacuum.

5. The method of encapsulating a nuclear fuel piece according to claim 4, further including the step of fixturing the channel pieces between interior and exterior chill blocks that abut flush against the faces of the channel pieces.

6. The method of encapsulating a nuclear fuel piece according to claim 5, further including the step of using two wedges each having an inclined face angled with respect to an outer face as the internal chill block means and of sliding the inclined faces on one another in one direction to expand the outer wedge faces snug against the channel legs, and of keying the internal chill block wedges together as thus expanded.

7. The method of encapsulating a nuclear fuel piece according to claim 6, further including the step of using internal chill block wedges formed of machined and hardened tool steel.

8. The method of forming the encapsulated nuclear fuel unit according to claim 7, further including the step of forming the end caps of a stainless steel having pores of approximately 5 micron size.

* * * * *